(12) United States Patent
Schwarzbich

(10) Patent No.: US 10,479,249 B2
(45) Date of Patent: Nov. 19, 2019

(54) SEAT ADJUSTER

(71) Applicant: Jörg Schwarzbich, Bielefeld (DE)

(72) Inventor: Jörg Schwarzbich, Bielefeld (DE)

(*) Notice: Subject to any disclaimer, the term of this patent is extended or adjusted under 35 U.S.C. 154(b) by 112 days.

(21) Appl. No.: 15/574,422

(22) PCT Filed: Jun. 3, 2016

(86) PCT No.: PCT/EP2016/062628
§ 371 (c)(1),
(2) Date: Nov. 15, 2017

(87) PCT Pub. No.: WO2016/206951
PCT Pub. Date: Dec. 29, 2016

(65) Prior Publication Data
US 2018/0290576 A1 Oct. 11, 2018

(30) Foreign Application Priority Data

Jun. 24, 2015 (DE) .................... 20 2015 103 313 U

(51) Int. Cl.
*B60N 2/90* (2018.01)
*B60N 2/22* (2006.01)
(Continued)

(52) U.S. Cl.
CPC ............. *B60N 2/938* (2018.02); *B60N 2/02* (2013.01); *B60N 2/16* (2013.01); *B60N 2/167* (2013.01);
(Continued)

(58) Field of Classification Search
CPC ......... B60N 2/938; B60N 2/2227; G05G 5/08
See application file for complete search history.

(56) References Cited

U.S. PATENT DOCUMENTS 2,873,832 A * 2/1959 Helm .................. F16B 1/04
192/223.1
3,938,633 A * 2/1976 Dietzsch ............. B27B 17/10
192/48.3
(Continued)

FOREIGN PATENT DOCUMENTS

DE 29802055 U1 7/1999
DE 29809418 U1 11/1999
(Continued)

OTHER PUBLICATIONS

Derwent Abstract of DE 102008052892 A1, Haida et al., Oct. 2009 (Year: 2009).*

*Primary Examiner* — Vinh Luong
(74) *Attorney, Agent, or Firm* — Richard M. Goldberg

(57) ABSTRACT

A seat adjuster, includes a brake acting between fixed and adjustable parts so the adjustable part is blockable in positions on the fixed part and releasable by a release element, an adjustment element acting on the release element, selectively adjusting the adjustable part in two opposite directions, and a locking element automatically engaging and interlockingly locking the adjustable part to the fixed part when the adjustment element is not actuated and automatically disengaging when the adjustment element is actuated, disengagement of the locking element and adjustment of the adjustable part being effected by moving the adjustment element out of neutral position, the locking element having a toothed segment for meshing with a toothed ring coupled to the adjustable part so the locking element is movable in the radial direction of the toothed ring between locking and release positions, in which the locking element meshes with or moves away from the toothed ring.

5 Claims, 6 Drawing Sheets

(51) Int. Cl.
  *G05G 5/08* (2006.01)
  *B60N 2/02* (2006.01)
  *B60N 2/16* (2006.01)
  *B60N 2/18* (2006.01)
  *B60N 2/235* (2006.01)

(52) U.S. Cl.
  CPC ............ *B60N 2/168* (2013.01); *B60N 2/169* (2013.01); *B60N 2/1889* (2013.01); *B60N 2/22* (2013.01); *B60N 2/2227* (2013.01); *B60N 2/2236* (2013.01); *B60N 2/236* (2015.04); *G05G 5/08* (2013.01); *G05G 2505/00* (2013.01)

(56) References Cited

U.S. PATENT DOCUMENTS

| | | | | |
|---|---|---|---|---|
| 6,253,894 | B1* | 7/2001 | Schumann | F16H 31/002 192/15 |
| 6,491,150 | B1* | 12/2002 | Hochmuth | F16D 41/066 192/38 |
| 2003/0230923 | A1* | 12/2003 | Uramichi | B60N 2/236 297/367 R |
| 2009/0236892 | A1* | 9/2009 | Cillierre | B60N 2/236 297/366 |
| 2011/0304190 | A1* | 12/2011 | Krueger | B60N 2/938 297/374 |
| 2014/0225409 | A1* | 8/2014 | Nagura | B60N 2/2356 297/354.1 |
| 2015/0096859 | A1* | 4/2015 | Isoda | F16D 41/18 192/15 |
| 2015/0291068 | A1* | 10/2015 | Stemmer | B60N 2/1685 297/463.1 |

FOREIGN PATENT DOCUMENTS

| | | |
|---|---|---|
| DE | 102008052892 A1 * | 10/2009 |
| DE | 102009013385 A1 | 12/2009 |
| EP | 0979179 B2 | 2/2000 |
| EP | 2840275 A1 | 2/2015 |
| WO | 2014/057091 A1 | 4/2014 |

* cited by examiner

SEAT ADJUSTER

BACKGROUND OF THE INVENTION

The invention relates to a seat adjuster, comprising a brake which acts between a fixed part and an adjustable part and by means of which the adjustable part can be blocked in different positions on the fixed part, and which can be released by means of a release element, an adjustment element, which acts on the release element, for selectively adjusting the adjustable part in two opposite directions, and a locking element, which automatically engages and interlockingly locks the adjustable part to the fixed part when the adjustment element is not actuated, and automatically disengages when the adjustment element is actuated, wherein the disengagement of the locking element and the adjustment of the adjustable part can be effected by moving the adjustment element out of a neutral position in one of the two directions.

EP 0 979 179 B2 describes a seat adjuster of this type which may for example serve for adjusting an inclination of a seat back or a height adjustment of a vehicle seat. The fixed part is rigidly mounted on the vehicle seat or the vehicle body, whereas the adjustable part effects the desired adjustment of the vehicle seat. The adjustment element has a lever which can be pivoted from a neutral position in two opposite directions in order to adjust the seat either in the one direction or the other direction. By repeated "pumping" with the adjustment element, it is possible to adjust the vehicle seat step-wise over a larger adjustment range. When the adjustment element is displaced from the neutral position, the brake entrains the adjustable part. When the user releases the adjustment element, the adjustable part is locked by the brake in the position reached at that time, whereas the adjustment element is returned to the neutral position under the action of a return spring, so that another adjustment stroke can be performed if necessary.

The brake is preferably formed by a so-called freewheel brake wherein the blocking of the adjustable part on the fixed part is effected by clamp rollers and associated clamp contours. This has the advantage that a practically continuous adjustment is possible, and—other than in case of a ratchet mechanism, for example—disturbing noises are hardly produced. If, however, the adjustable part is subject to a permanently acting torque over a longer period of time, for example, in case of a seat height adjuster, due to the proper weight of the vehicle seat or the weight of a person sitting thereon, vibrations that occur when the vehicle is in motion may lead to a gradual roll-off of the clamp rollers at the races of the brake and, therewith, to an undesired gradual adjustment of the vehicle seat. In the known seat adjuster, this effect is avoided by additionally locking the adjustable part on the fixed part with interlocking engagement.

In the known seat adjuster, the locking element is formed by pivotable pawls, which, in the locked position, engage a gear ring that is rigidly coupled to the adjustable part and, in an initial phase of an adjustment operation, is tilted out of the locked position. Due to this construction, the locking element can withstand only a limited torque.

For safety reasons, seat adjusters for vehicles have to be designed such that they safely hold the seat in the adjusted position even when, in case of an accident, an extremely high torque acts upon the seat adjuster due to forces of inertia that are generated in an impact. For this reason, the freewheel brake of the known seat adjuster is designed such that the adjustable part is safely locked on the fixed part even in case of a very high torque.

SUMMARY OF THE INVENTION

It is an object of the invention to provide a seat adjuster of the type described above which has a more compact design and can be produced at lower costs.

According to the invention, this object is achieved by the feature that the locking element has a toothed segment for meshing with a toothed ring coupled to the adjustable part and is guided on the fixed part in such a way that the locking element can be moved in the radial direction of the toothed ring between a locking position, in which the locking element meshes with the toothed ring, and a release position, in which the locking element is moved away from the toothed ring.

Thus, according to the invention, the locking element is guided on the fixed part in such a manner that it performs a linear translational movement by which the toothed segment is brought into and out of engagement with the toothed ring. The toothed segment may extend over a relatively large peripheral angle of the toothed ring, so that a high torque can be transmitted onto the toothed segment. The forces that are thereby transferred onto the locking element act in a direction transverse to the direction of adjustment and, due to the linear guides, can directly be absorbed in the fixed part. In this way, the necessary crash safety can be achieved by mechanical interlocking, so that the brake, which has clamp rollers, for example, needs to hold the adjustable part only temporarily, namely during the return movement of the adjustment element into the neutral position. Consequently, the brake needs to be designed only for a substantially lower torque, which permits a compact design and the use of low-cost materials and/or a reduction of the number of clamp rollers. In this way, the manufacturing costs are reduced, and a more compact design of the seat adjuster can be achieved concurrently therewith.

Useful details and further developments of the invention are indicated in the dependent claims.

In an advantageous embodiment, the toothed ring is formed at the release member which is movable relative to the adjustable part only within a very limited angular range. Thus, the form-fitting locking of the adjustable part is also achieved by the form-fitting locking of the release element.

The toothed ring of the release element may also be used for providing a releasable coupling between the release member and the adjustment member, for instance via a further toothed segment which engages the toothed ring only during the movement of the adjustment member away from the neutral position, whereas it is released from the toothed ring during the return movement of the adjustment member, so that the adjustment element can return into the neutral position smoothly and with low noise production.

BRIEF DESCRIPTION OF THE DRAWINGS

An embodiment example will now explained in conjunction with the drawings, wherein.

DETAILED DESCRIPTION

Figure 1:
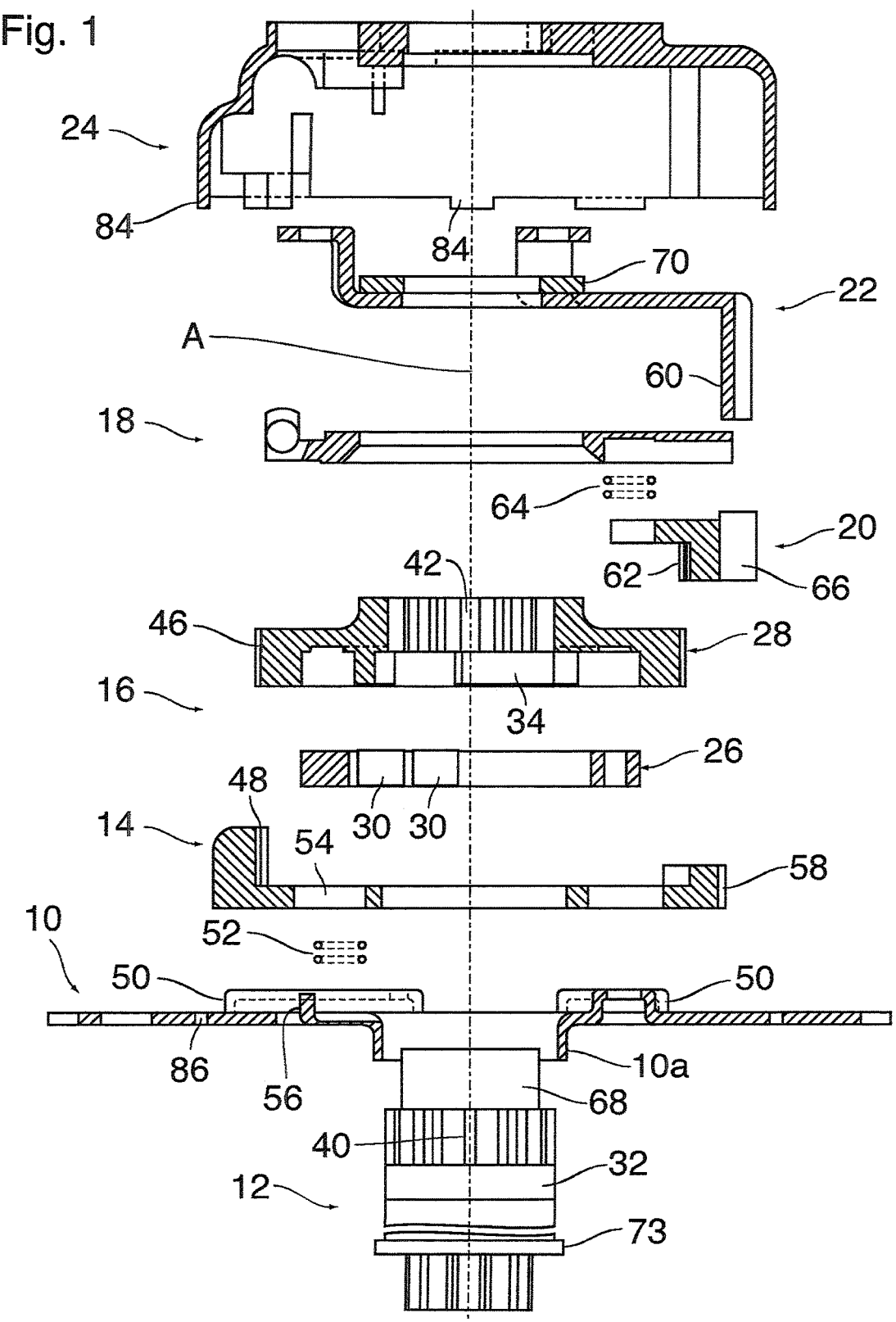
FIG. 1 is an exploded view of a seat adjuster wherein the various components are shown in an axial section, respectively, taken along line I-I in FIG. 4.

The seat adjuster shown in FIG. 1 has, as fixed part, a base plate 10 made of punched metal, and, as adjustable part, a pinion 12 that is rotatable about an axis A. Other main components of the seat adjuster are a locking element 14 made of plastics or metal, a brake 16, a return lever 18 with a slide 20, an adjustment element 22 and a cover 24 which, together with the base plate 10, forms an essentially closed casing that accommodates the other components.

The brake 16 is a clamp roller type freewheel brake having an outer metal ring 26, a release element 28 made of plastics or metal, and three pairs of clamp rollers 30 which engage an inner peripheral surface of the outer ring 26. An inner race 32 for the clamp rollers 30 is formed by the outer peripheral surface of a portion of the pinion 12.

Figure 2:
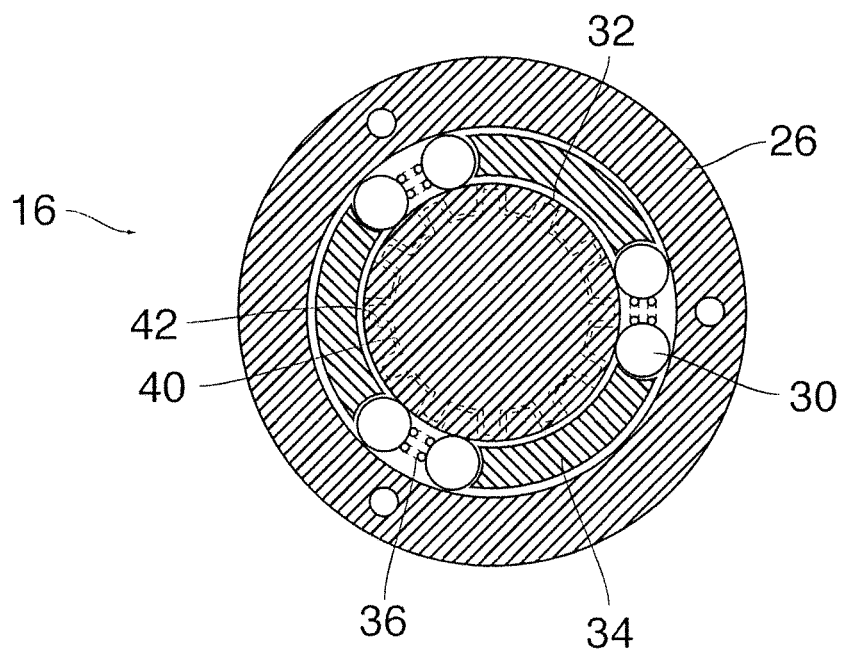
FIG. 2 is a cross-section of a clamp roller type freewheel brake in the seat adjuster according to FIG. 1, taken along line II-II in FIG. 3.

As is shown in FIG. 2, the inner race 32 and the internal peripheral surface of the outer ring 26 form a gap which accommodates the clamp rollers 30. The release element 28 forms three claws 34, which engage in this gap in respective spacings between the pairs of the clamp rollers 30. Elastic members 36 are respectively arranged between the clamp rollers 30 of each pair for urging these clamp rollers apart.

The inner race 32 is not perfectly cylindrical but forms a clamp contour which is designed such that the gap for the clamp rollers becomes narrower in the direction from the respective clamp roller towards the adjacent claw 34.

Figure 3:
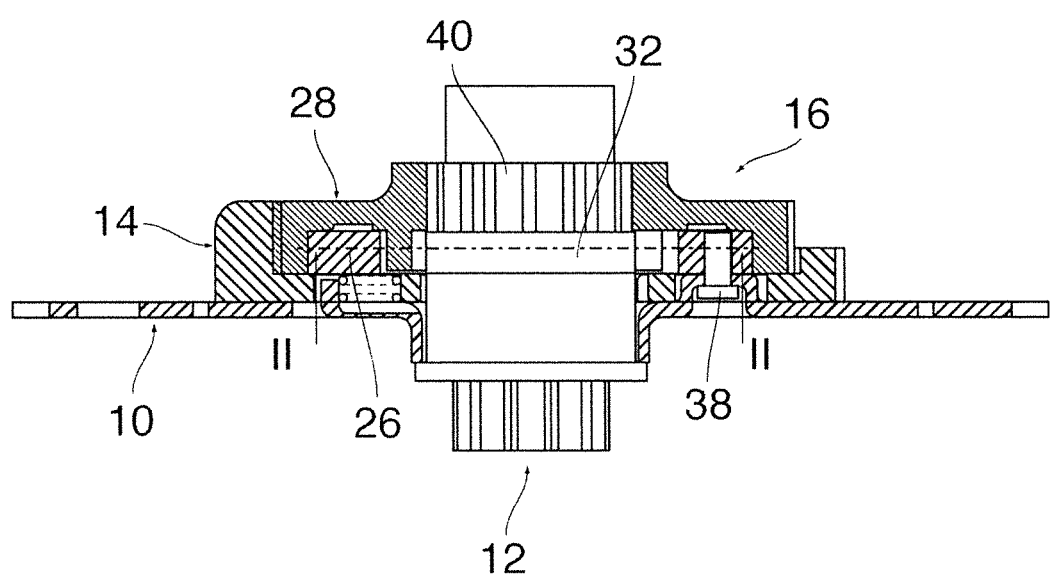
FIG. 3 shows the components of the freewheel brake in an axial section and in an assembled state, taken along line I-I in FIG. 4.

As is shown in FIG. 3, the outer ring 26 is held non-rotatably on the base plate 10 by means of bolts 38. A portion of the pinion 12 adjacent to the inner race 32 is received in a bore of the release element 28 and has grooves 40 distributed on its periphery. The inner surface of the bore of the release member 28 is formed with projecting ribs 42 which engage in the grooves 40 with play, so that the pinion 12 is rotatable relative to the release member 28 by a small angle.

Consequently, when a torque acts upon the pinion 12 in one of the two directions of rotation, the pinion has the tendency to rotate relative to the release element 28, with the clamp rollers 30 sliding along the outer ring. In that case, however, one of the clamp rollers 30 of each pair will enter more deeply into the narrowing part of the gap and cause a clamp action between the outer ring 26 and the race 32, whereby the pinion 12 is blocked relative to the non-rotatable outer ring 26.

In contrast, when the release element 28 is rotated, the claws 34 respectively urge one of the adjacent clamp rollers 30 against the elastic member 36, which will yield elastically, whereby the clamp roller is urged into the widening part of the gap and is prevented from blocking. Simultaneously, the ribs 42 engaging in the groves 40 entrain the pinion 12 so that the release element 28 and the pinion 12 are rotated together. As soon as the release element 28 is relieved again from the torque, the clamp rollers 30 are urged again into the clamping position by the elastic members 36, and the pinion will again be blocked in the position that has then been reached.

As is shown in FIG. 1, the release element 28 has, on a part straddling the outer ring 26, a toothed ring 46 that is formed on the entire periphery of the release element. The locking element 14 has a toothed segment 48 which can be brought into engagement with a peripheral section of the toothed ring 46. The locking element 14 has the general shape of a flat plate which is guided for sliding movement between projections 50 of the base plate 10. As is shown in FIG. 4, the locking element is guided practically without play, and the projections 50 punched out of the base plate 10 are designed such that a stable form fit between the base plate 10 and the locking element 14 is achieved in the direction normal to the direction of the sliding movement.

Figure 4:
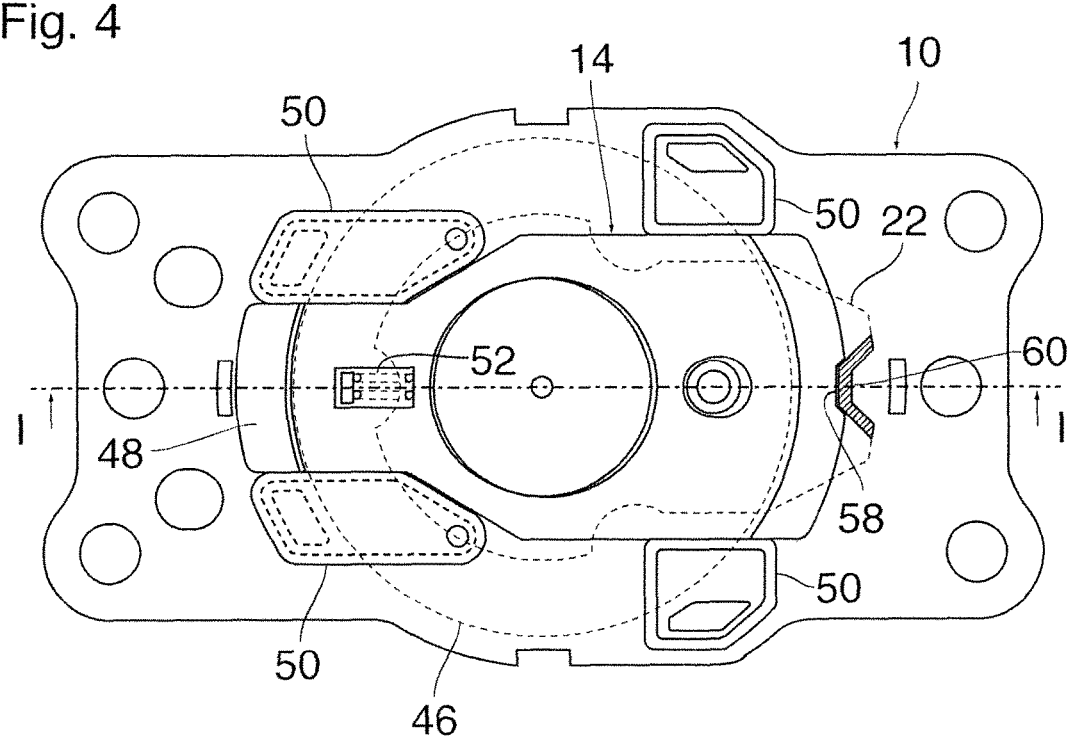
FIG. 4 is a plan view of a locking element and a base plate as well as a sectional view of a part of an adjustment member in a neutral position.

A spring 52 is received in a recess 54 of the locking element 14 and is supported, on the one hand, at a wall of this recess 54 and, on the other hand, at a lug 56 that is bent from the base plate 10, so that the locking element 14 is biased to the right in FIGS. 1 and 4 into a position in which the toothed segment 48 is in engagement with the toothed ring 46.

Figure 5:
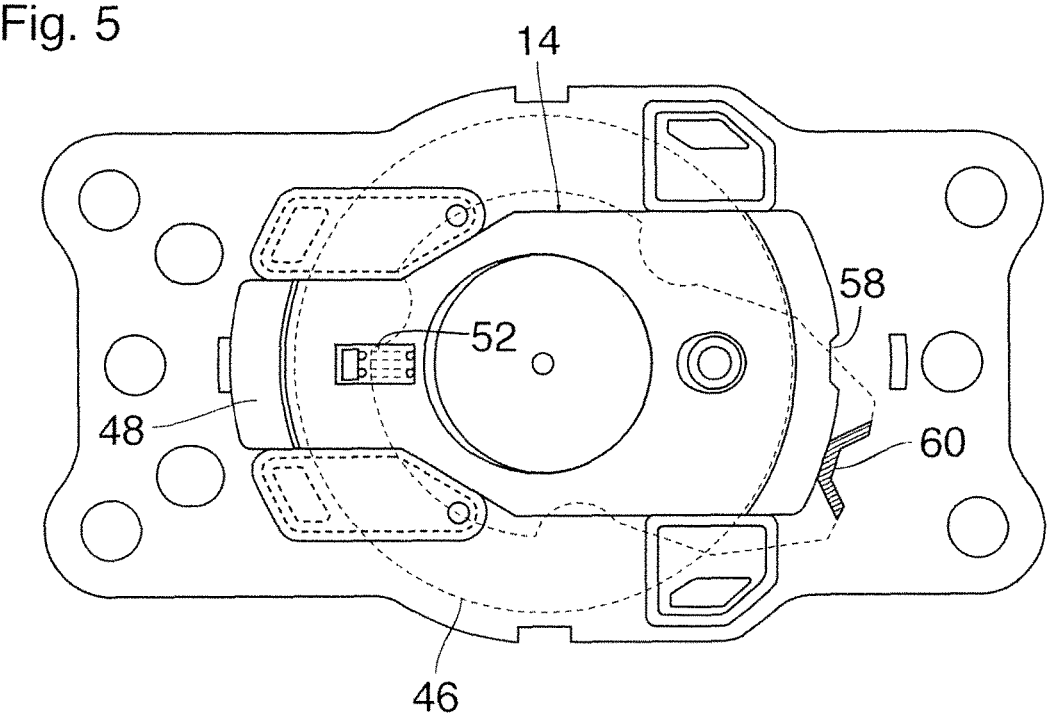
FIG. 5 is an illustration corresponding to FIG. 4, with the adjustment element being rotated out of the neutral position.

At the right end in FIGS. 1 and 4, the edge of the locking element 14 forms a notch 58 with trapezoidal contour. The adjustment element 22 has, at the right end in FIG. 1, a downwardly projecting cam 60 which has a trapezoidal contour complementary to the notch 58 and engages in this notch in a neutral position shown in FIG. 4. When, however, the adjustment element 22 is rotated out of the neutral position, for example into the position shown in FIG. 5, the cam 60 runs onto a flank of the notch 58 and thereby causes a displacement of the locking element 14 to the left, overcoming the force of the spring 52, so that the toothed segment 48 releases the toothed ring 46. The edge of the locking element 14 adjacent to the notch 58 on both sides extends along a circular arc that is centered on the axis A which also forms the axis of rotation of the adjusting element 22. Consequently, the cam 60, as soon as it has left the notch 58, holds the locking element 14 in a position in which the toothed segment 48 is remote from the toothed ring 46.

Figure 6:
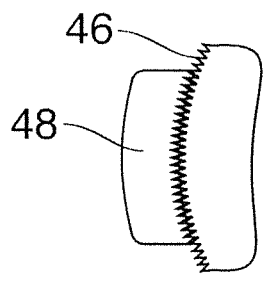
FIGS. 6 and 7 are enlarged detail views of a teeth engagement of the locking element with a toothed ring.
Figure 7:
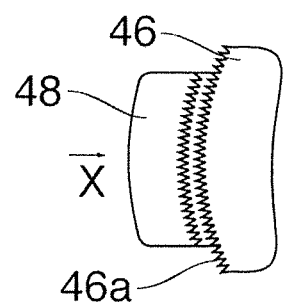

FIG. 6 shows the toothed segment 48 in a position in which it is in engagement with the toothed ring 46. FIG. 7 shows the toothed segment 48 in a position remote from the toothed ring 46. In order to enable the toothed segment 48 to be brought into and out of engagement with the toothed ring 46, the teeth 46a of the toothed ring 46 must not form an undercut in the direction X of sliding displacement of the locking element. In the example shown, this condition is fulfilled because the flanks of the teeth 46a at the upper and lower ends of the toothed segment 48 in FIG. 7 are parallel to the direction of displacement. The shallower the flanks of the teeth 46, the larger is the peripheral angular range of the toothed ring 46 over which the toothed segment 48 may extend without violating the above-mentioned condition. However, the flanks of the teeth should in any case be so steep that a self-locking action is achieved between the teeth of the toothed ring 46 and the toothed segment 48, so that the toothed segment will not be urged out of the engaged position when a torque acts upon the toothed ring 46.

As is shown in FIG. 1, the slide 20 that is guided on the return lever 18 has also a toothed segment 62 that can be brought into engagement with the toothed ring 46 of the release element 28. A spring 64 is supported at the release lever 18 and biases the slide 20 into a position in which the toothed segment 62 is remote from the toothed ring 46. At the outmost end, on the right side in FIG. 1, the slide 20 has a notch 66 with trapezoidal contour which is also complementary to the cam 60 but has a greater depth than the notch 58 of the locking element 14.

Figure 8:
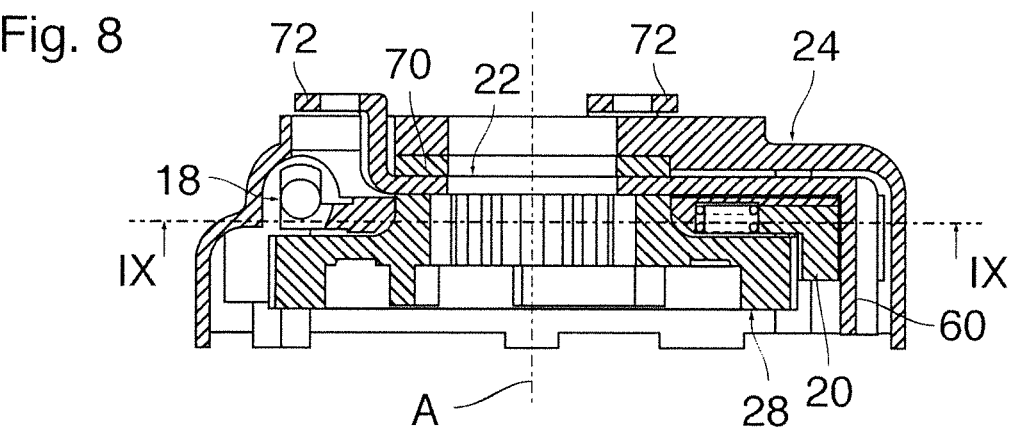
FIG. 8 is an axial section of parts of the seat adjuster in the assembled state, taken along line I-I in FIG. 4.

FIG. 8 shows the release element 28, the return lever 18 with slide 20, the adjustment element 22 and the cover 24 in the assembled state. The slide 20 has been shown here in a position in which its toothed segment releases the toothed ring of the release element 28 and the cam 60 of the adjustment member 22 fits in the notch 66 of the slide.

The adjustment element 22 is supported for rotation on a cylindrical extension 68 of the pinion 12 (FIG. 1) which engages also in a bearing ring 70 provided between the adjustment element 22 and the cover 24. Three mounting arms 72 of the adjustment element 22, that are arranged in angular spacings of 120° pass through arcuate slots in the top wall of the cover 24 and thereby permit to attach an actuating lever, that has not been shown, on the outside of the cover 24.

Figure 9:
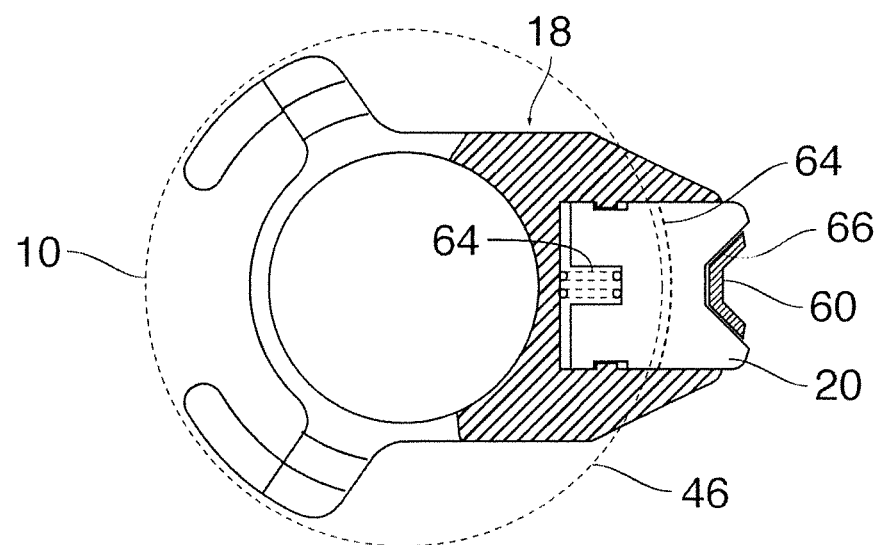
FIG. 9 is a plan view, partly in section, of a return lever and a slide together with a part of the adjustment element, taken along line IX-IX in FIG. 8.

FIG. 9 shows, partly in section and partly in top plan view, the return lever 18 and the slide 20 as well as—in cross-section—the cam 60, and illustrates the same condition as FIG. 8. The return lever 18 is rotatable on a hub that is formed at the release element 28 and is rotatable about the axis A independently of the adjustment element 22.

The bearing ring 70 is press-fitted on the extension 68 of the pinion and has a slightly conical shape, so that it presses upon the adjustment element 22 in the manner of a dish spring and at the same time draws a collar 73 of the pinion 12 against the lower edge of a boss 10a of the base plate 10 (FIG. 1). In this way, the components that are penetrated by the pinion are held together and, further, as shown in FIG. 8, the actuating element 22 is biased against the top end face of the release element 28.

Figure 10:
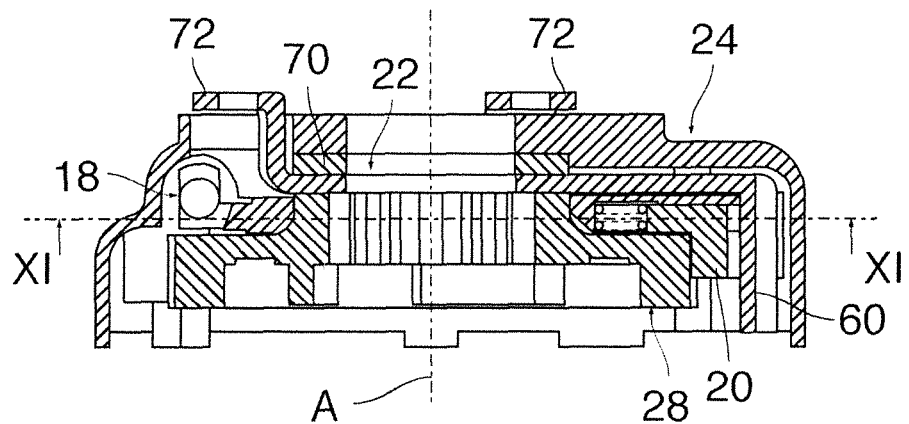
FIGS. 10 and 11 are illustrations analogous to FIGS. 8 and 9 with the adjustment element being moved out of the neutral position, and with the section of FIG. 10 taken along line I-I in FIG. 4 and the section of FIG. 11 taken along line XI-XI in FIG. 10.
Figure 11:
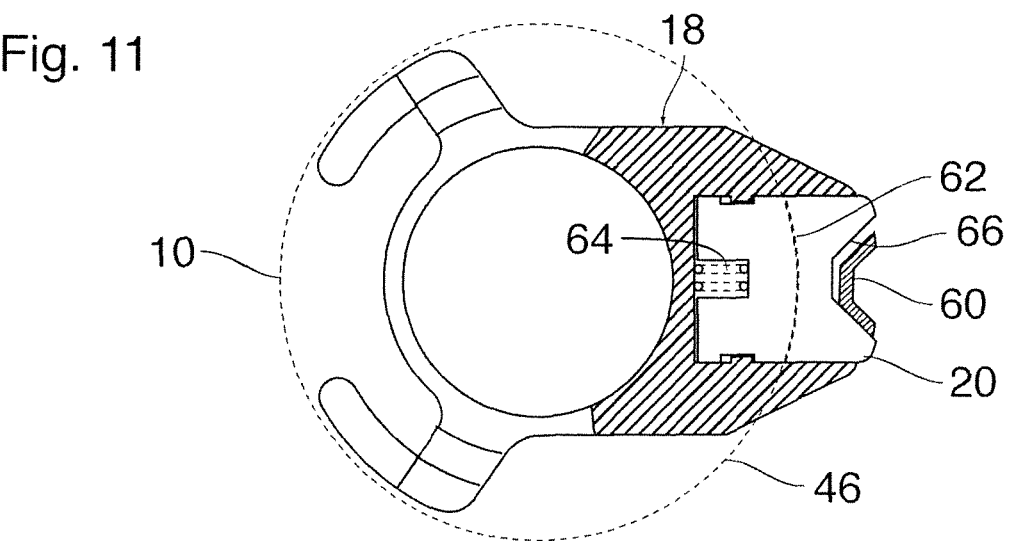

When the adjustment element 22 is rotated out of the neutral position shown in FIGS. 8 and 9, it exerts a torque on the release element, due to frictional contact, and at the same time the cam 60 runs on a flank of the notch 66 of the slide 20, whereby the slide 22 is shifted inwards against the force of the spring 64 into the position shown in FIGS. 10 and 11. Then, the toothed segment 62 of the slide is in engagement with the toothed ring 46. When the rotation of the adjustment element 20 is continued, the unit formed by the slide 22 and the return lever 18 is entrained by the notch 60, and the rotary movement is transmitted onto the release element 28 via the toothed segment 62 and the toothed ring 46.

The notches 66 and 58 of the slide 20 and the locking element 14 are so dimensioned that, when the adjustment element 20 with the cam 60 is moved away from the neutral position and thereby the engagement between the toothed segment 64 and the toothed ring 46 and, consequently, the drive connection to the release element 28 is established, the locking element 14 is simultaneously shifted into the unlocked position. The phase of the movement in which the teeth of the toothed segment 62 come into engagement with the teeth of the toothed ring 46 may overlap in time or coincide with the phase in which the teeth of the toothed segment 48 of the locking element 14 are released from the toothed ring 46. Then, in the further course of the rotary movement of the adjustment element 22, the release element 28 causes the release of the brake 16 and the adjustment of the pinion 12.

The spring force of the spring 42 for the locking member 14 is preferably dimensioned such that, in the initial phase of the pivotal movement, when the cam 60 unlocks the locking element 14, the user feels a resistance which is approximately as high as later during the proper adjustment process.

Due to the construction described above, it is achieved that the user does practically not experience any dead stroke or play when he or she moves the adjustment element 22 out of the neutral position in order to initiate the adjustment movement of the pinion.

Figure 12:
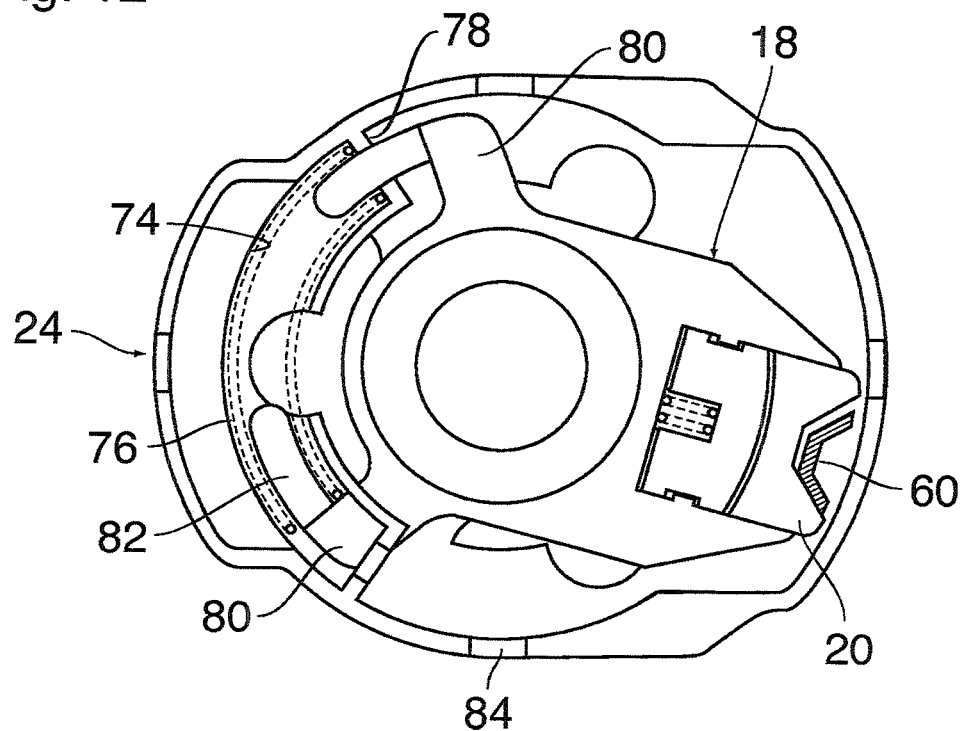
FIG. 12 shows the return lever, the slide and a cover of the seat adjuster in a bottom view.

FIG. 12 shows the cam 60, the slide 20 and the return lever 18 in the rotated position. FIG. 12 further shows the cover 24 in a bottom view, and it can be seen that this cover forms a spring tunnel 24 which extends in the form of a circular arc around the axis A and accommodates a spring 76 (helical compression spring) which follows the extension of the tunnel. The cover 24 forms radial walls 78 which delimit the spring tunnel 74 at its ends on a part of its cross-section.

The return lever 18 also forms two radially projecting supports 80 for the spring 76. Each of these supports has a bent lug 82 which engages in the corresponding end of the spring 76. When the return lever 18 is in the neutral position, the supports 80 are flush with the radial walls 78 of the cover, so that each end of the spring 76 is commonly supported by one of the walls 78 and one of the supports 80. However, when the return lever 18 is rotated in the manner shown in FIG. 12, one end of the spring (the top end in FIG. 12) is supported at the wall 78 of the cover, whereas the other end is supported at the support 80 of the return lever, so that the spring 76 is compressed.

When, now, the actuating lever is released and, consequently, no torque acts on the adjustment element 22, the force of the spring 64 causes the slide 20 to be extended again so that the engagement between the toothed segment 62 and the toothed ring 46 is released. In this process, the adjustment element 22 is slightly rotated relative to the return lever 18, until the cam 60 is again centered in the notch 66. Now, the return lever 18 is subject to the force of the spring 76 and is thereby rotated into the neutral position together with the slide 20, whereby the adjustment element 22 is also returned into the neutral position whereas the pinion 12 is held by the brake 16 in the position it has reached.

As soon as the adjustment element 22 has returned into the neutral position, the cam 60 can again be received in the notch 58 of the locking element, and the spring 52 assures the automatic return of the locking element 14 into the locked position. Thanks to the triangular shape of the teeth 46a, there is practically no tooth-on-tooth position which would compromise the re-establishment of the engagement of the teeth. At the latest, however, the engagement is established when, due to slight vibrations or due to a roll-off of the clamp rollers, a minor rotation occurs between the release element 28 and the locking element 14.

When the neutral position has been reached—or optionally even at an earlier time—the pinion 12 may be rotated another step in the desired direction by rotating the adjustment element 22 again.

Figure 13:
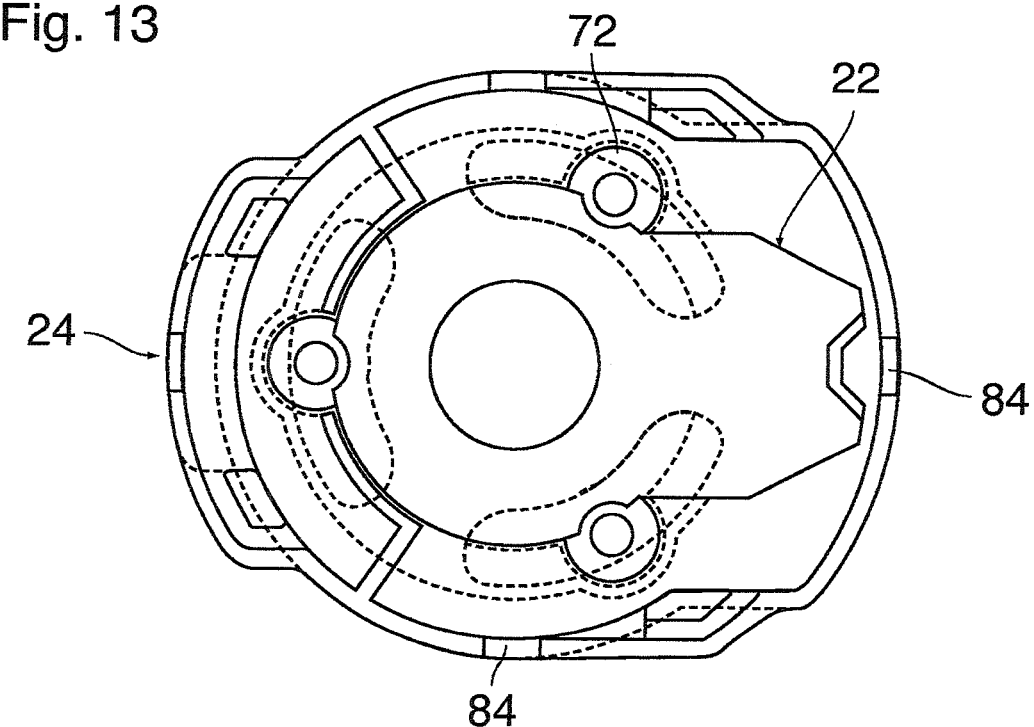
FIG. 13 shows the adjustment element and the cover in a bottom view.

FIG. 13 shows the adjustment element 22 and the cover 24 in a bottom view. The hidden contours of the cover 24 which delimit the recesses in the top wall of the cover which permit the rotary movement of the mounting arms 32 and the feedthrough of the mounting arms through the top wall of the cover in the assembly process, have been shown in phantom lines. At the lower edge of its peripheral wall, the cover has projections 84 which engage in corresponding insertion openings 86 of the base plate 10 (FIG. 1). Screwposts or the like, which have not been shown, permit to firmly attach the cover 24 to the base plate 10. The base plate 10 can be mounted in a suitable position at the seat frame or a part of the vehicle body, so that the pinion 12 meshes with an input gear or a toothed rack (not shown) of a transmission with which the vehicle seat is adjusted.

What is claimed is:

1. A seat adjuster, comprising:
    a brake which acts between a fixed part and an adjustable part and by which the adjustable part is adapted to be blocked in different positions on the fixed part and is adapted to be released by a release element thereof,
    an adjustment element which acts on the release element, for selectively adjusting the adjustable part in two opposite directions, and
    a locking element which automatically engages and interlockingly locks the adjustable part to the fixed part when the adjustment element is not actuated and automatically disengages when the adjustment element is actuated,
    wherein the disengagement of the locking element and the adjustment of the adjustable part is adapted to be effected by moving the adjustment element out of a neutral position in one of the two directions,
    wherein the locking element has a toothed segment for meshing with a toothed ring coupled to the adjustable part and is guided on the fixed part in such a way that the locking element is adapted to be moved in a radial direction of the toothed ring between a locking position, in which the locking element meshes with the toothed ring, and a release position, in which the locking element is moved away from the toothed ring,
    wherein the brake is a clamp roll freewheel brake and the release element thereof forms the toothed ring and is in engagement with the adjustable part such that a relative rotation of the release element and the adjustable part is possible only within a limited play,
    wherein the adjustment element is provided with a radially movable slide which has another toothed segment for engagement with the toothed ring, and
    wherein the adjustment element and the slide are in engagement with one another via complementary cams and notches such that a torque that is transferred from the adjustment element onto the slide causes a radial movement of the slide for establishing the engagement with the toothed ring.

2. The seat adjuster according to claim 1, wherein the complementary cams and notches translate rotary movement of the adjustment element away from the neutral position into a displacement of the locking element into the release position.

3. The seat adjuster according to claim 1, wherein the locking element is elastically biased into the locked position.

4. The seat adjuster according to claim 1, further including a release lever that is rotatable independently of the adjustment element about a same axis of rotation and is elastically biased into the neutral position, and wherein the slide is guided on the release lever.

5. The seat adjuster according to claim 1, wherein the adjustment element is elastically biased in an axial direction of the toothed ring into a position in which the adjustment element it is in frictional engagement with the release element.

* * * * *